(12) United States Patent
Douma (10) Patent No.: US 6,483,774 B2
(45) Date of Patent: Nov. 19, 2002

(54) TIMED SHOOTING WITH A DYNAMIC DELAY

(75) Inventor: Jan Douma, Houston, TX (US)

(73) Assignee: Westerngeco, L.L.C., Houston, TX (US)

( * ) Notice: Subject to any disclaimer, the term of this patent is extended or adjusted under 35 U.S.C. 154(b) by 49 days.

(21) Appl. No.: 09/805,092

(22) Filed: Mar. 13, 2001

(65) Prior Publication Data

US 2002/0132594 A1 Sep. 19, 2002

(51) Int. Cl.$^7$ .............................. G01V 1/38; G01V 1/08
(52) U.S. Cl. ......................................... 367/16; 181/107
(58) Field of Search ..................... 702/14, 16; 367/73, 367/38, 76, 79, 55, 56, 23, 16; 181/107, 110

(56) References Cited

U.S. PATENT DOCUMENTS

| | | | |
|---|---|---|---|
| 4,300,653 A | * 11/1981 | Cao et al. .................... | 181/107 |
| 4,511,999 A | 4/1985 | Bowden et al. ............... | 367/23 |
| 5,650,981 A | 7/1997 | Jacobsen et al. .............. | 367/19 |
| 5,724,241 A | 3/1998 | Wood et al. ................... | 702/14 |
| 6,002,640 A | * 12/1999 | Harmon ....................... | 367/38 |
| 6,327,537 B1 | * 12/2001 | Ikelle .......................... | 367/73 |

* cited by examiner

Primary Examiner—Gregory J. Toatley, Jr.
(74) Attorney, Agent, or Firm—David S. Figatner; Madan, Mossman & Sriram, P.C.

(57) ABSTRACT

The present invention, in certain embodiments, discloses a method for acquiring marine seismic data using a seismic acquisition system where shot points are determined and shot records recorded. A time at which the source vessel will be substantially at a shot point position is predicted and the seismic source is activated at the shot point. The shot is recorded and the next location for recording a shot is determined. If the source vessel has passed the determined next shot point position, the seismic source is activated and a shot is recorded. If the source vessel has not reached the next shot point, a time delay is implemented until the shot point is reached. The method allows for efficient acquisition of seismic data under varying field conditions by resembling a distance based shot point determination method unless a time based acquisition method becomes more appropriate due to field conditions or other operational considerations.

20 Claims, 6 Drawing Sheets

TIMED SHOOTING WITH A DYNAMIC DELAY

FIELD OF THE INVENTION

This method is directed to marine seismic data acquisition systems and, in one aspect, such systems with a streamer, streamers, and/or one or more seismic sources towed by one or more powered vehicles. This invention is related to the field of Common Mid-Point (CMP) marine seismic data acquisition.

BACKGROUND OF THE INVENTION

In the field of marine seismic data acquisition, seismic signal sources, e.g. air guns, are towed behind a vessel, which may also tow a set of seismic sensors. The sensors are normally contained in streamers that are comprised of seismic signal receivers, e.g. hydrophones, which are sensitive to reflections and refractions from sound impulses emitted by seismic sources.

It has long been known that for high quality data, multiple samplings of the same subsurface areas are required. The addition of multiple signals from the same subsurface reflection point results in an increase in the information in signals along with a cancellation of the noise. This process is commonly known as the Common Mid-Point method.

Figure 1A:
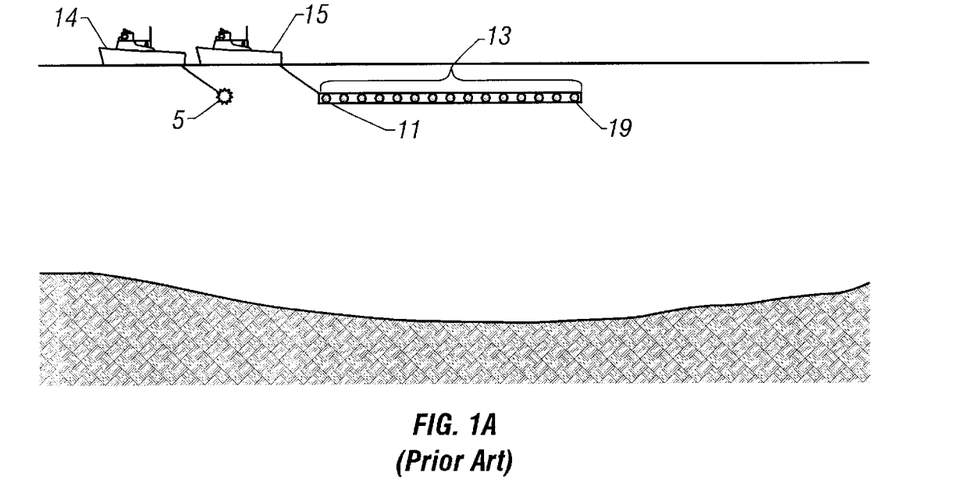
FIGS. 1A–1C are prior art illustrations of traditional marine seismic data acquisition.

FIG. 1A shows schematically a marine seismic survey system. A ship 14 tows a seismic source 5 of any known type, for instance air guns. Activating or firing a seismic source initiates acoustic energy which propagates from the source through the water and the earth. Also towed by ship 15 in this example are one or more sets of seismic sensors 13 or seismic receivers usually referred to generally as streamers. Acoustic energy propagated through the earth from subterranean features and may be detected by seismic sensors. The seismic sensors in the streamers may be single sensors or groups of sensors. The same vessel often tows streamers and sources, but this varies with survey acquisition logistics. Streamer 13 contains, as an example for the illustration, 15 sensors or groups of sensors; sensor 11 is closest to source 5 while sensor 19 is furthest away. Modern streamers may contain hundreds of sensors or sensor groups. Modern seismic acquisition systems may contain many streamers and several sources all in operation to acquire data in an area.

Figure 1B:
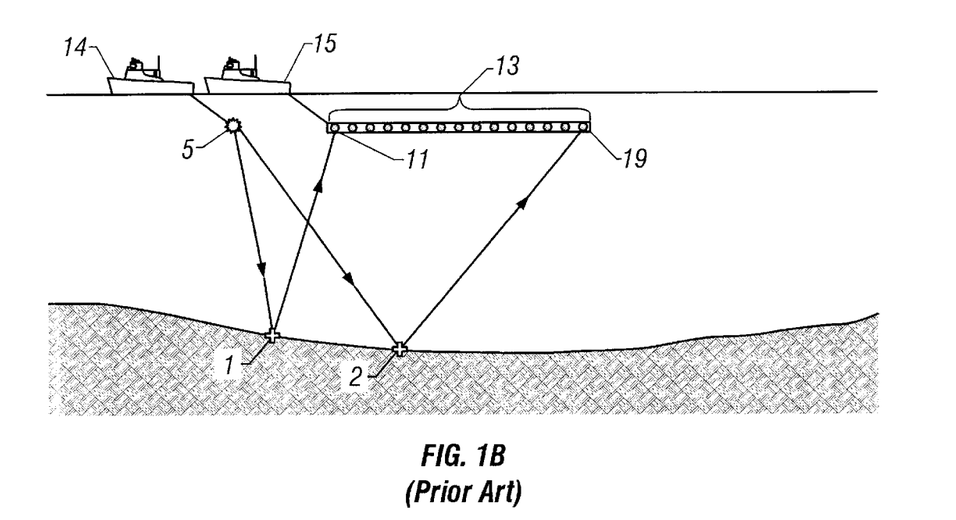

FIG. 1B shows how seismic energy propagates from the seismic source 5 to the streamer 13 sensors. Each time a seismic impulse is generated by a source, there is a corresponding midpoint (or Common Mid-Point, CMP) for every seismic sensor in a streamer. Seismic energy generated by source 5 travels to midpoint or CMP 1 and is reflected back to seismic sensor 11, the nearest sensor to source 5 of streamer 13. Seismic energy also reflects off of CMP 2 and travels to seismic sensor 19, the furthest sensor from source 5 of streamer 13. Of course, there are midpoints or CMPs corresponding to each seismic source impulse with each of the streamer 13 sensors. For example, the streamer shown in FIG. 1B contains 15 seismic sensors, and so each seismic impulse generated by source 5 would produce 15 CMPs from CMP 1 to CMP 2 inclusive.

Figure 1C:
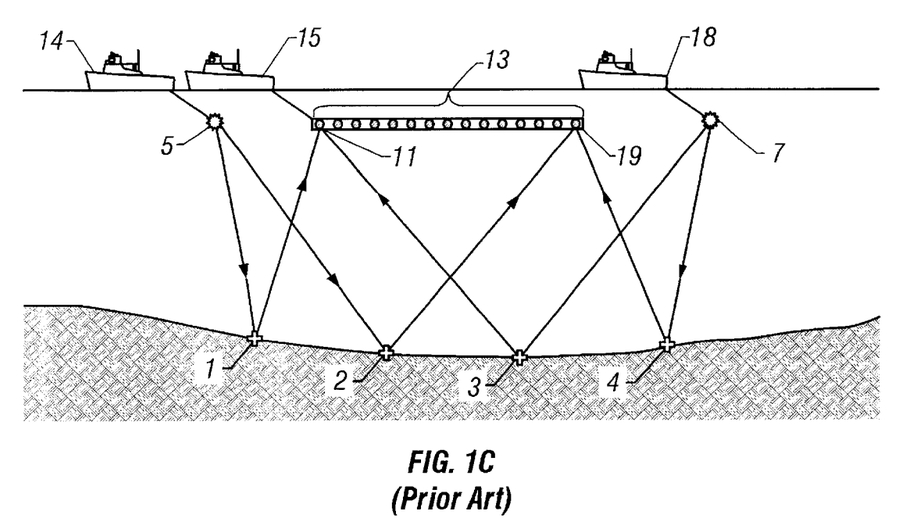

FIG. 1C shows how the addition of another seismic source 7 towed, for example by ship 18, will produce CMPs from a source following the acquisition system in the direction of survey as demonstrated in FIGS. 1A and 1B. Here, the seismic energy travels from seismic source 7 to CMP 4 and back to the seismic sensor 19 nearest the source 7. Seismic energy travels from source 7 to CMP 3 and then the seismic sensor 11 furthest from source 7. Again, there are CMPs for each seismic sensor and seismic source pair, each time a source generates a seismic impulse.

As is known in the art, the number of times the same subsurface mid-point areas are sampled is commonly referred to as the "fold" of the survey. A uniform distribution of fold over a survey area is desirable. A method or system that will lead to efficient acquisition of seismic surveys having a uniform distribution of fold is desirable. Uniformity in fold distribution results in a more even and predictable subsurface resolution, and therefore, seismic surveys with a more uniform fold distribution are desirable and operational changes that result in a haphazard or unpredictable fold distribution are not desirable.

Another way to improve subsurface resolution is to increase the areal resolution of a seismic survey by moving sampling bins closer together by decreasing the size of the subsurface sampling areas known as midpoint or CMP bins. Subsurface sampling areas (e.g. CMP spacing) need to be made as small as operational and economic constraints will allow.

The recording systems used for marine seismic data acquisition normally allow firing of shots based on distance, the Distance Shooting method, or based on time, the Timed Shooting method. For geophysical reasons (for instance, fold uniformity) the preferred option is to fire shots based on distance. However, when currents in the seismic survey area are too strong the Distance Shooting method may be problematic to implement and up to half of the expected shots may be missed. Under strong current conditions the timing method may be preferred. Recording systems are set up to handle either the 'distance shooting method' or the 'timed shooting method,' but not both at the same time. Recording systems must normally not be acquiring data for a switch between one system and the other to be made. This results in an interruption of the survey acquisition program and can be an inefficient use of resources.

Marine seismic operations are often large, complex and expensive. There are recognized needs for improving the efficiency of seismic field operations. A system and method that will increase survey efficiency and streamline operational logistics is highly desirable. The present invention addresses these recognized needs.

Accordingly, there is a need for a method and system to acquire seismic data efficiently without having to interrupt field operations to change from one acquisition method, for example based on timed shooting, to another method, for example based on distance or position shooting. The prior art does not disclose systems or methods to improve the efficiency of the use of acquisition equipment as embodied in the present invention.

SUMMARY OF THE INVENTION

The present invention, in certain embodiments, discloses a method for acquiring marine seismic data using a seismic acquisition system where shot points are determined and shot records recorded. A time at which the source vessel will be substantially at a shot point position is predicted and the seismic source is activated at the shot point. The shot is recorded and the next location for recording a shot is determined. If the source vessel has passed the determined next shot point position, the seismic source is activated and a shot is recorded. If the source vessel has not reached the next shot point, a time delay is implemented until the shot point is reached. The method allows for efficient acquisition of seismic data under varying field conditions with minimal operational interruptions by acquiring data using a distance based shot point determination method unless a time based acquisition method becomes more appropriate due to field conditions or other operational considerations.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

For the purpose of clarity and explanation, the method of this invention will be described by way of example, but not by way of limitation, with respect to marine seismic data acquisition systems using satellite navigation. It is to be clearly understood that the method may be applied to any marine seismic data recording, positioning or acquisition system and is not limited in terms of the number of streamers, the number of sources or the particular spacing measurements as used in the example embodiments. The distances between source points are determined by operational and geophysical considerations.

The present invention combines the 'Distance' and 'Time' methods. A preferred embodiment outlined here uses the seismic acquisition system as if data were acquired by shooting based on time, but the method will dynamically delay the start time of the next shot such that the distance between shots may be kept substantially equal to a required shot point distance. When the shooting vessel is sailing in the direction of the current, if the current gets too strong the dynamic delay will reduce to zero and the recording system will behave as if it was shooting based on time, which may be for this situation, the best possible operational procedure.

Figure 2:
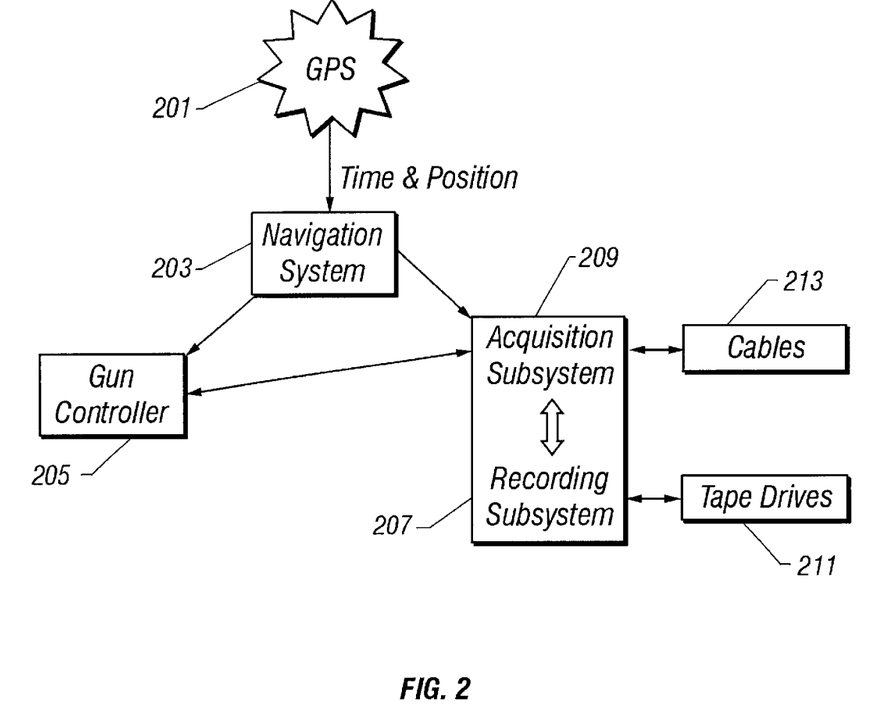
FIG. 2 is a schematic illustration of a Seismic Acquisition System

FIG. 2 is a general schematic diagram of a marine seismic acquisition system. A global positioning system (GPS) 201 may be used to determine both time and the position of the seismic vessel, various system components and subsystems making up the acquisition system. The navigation system 203 uses the GPS information to determine position and heading for the acquisition vessels and various components, and to archive the information. At the appropriate time before the seismic source vessel reaches the first shot point (actual timing may vary with the type of recording system) the navigation system sends a start signal to the acquisition subsystem 209. This start signal is just an arming signal to prepare the system for the upcoming shot. The acquisition subsystem 209 transmits the start signal to the recording subsystem 207. The recording subsystem 207 starts a timer and waits for a signal that the shot is occurring. As the predicted time approaches, the navigation system 203 sends a fire command signal to the gun controller 205 to initiate the firing sequence. The gun controller 205 performs some internal checks to optimize the energy of the source and fires the guns. The gun controller 205 sends a signal back to the navigation system 203 and to the acquisition subsystem 209 at the time the guns are fired. The recording subsystem 207 begins recording seismic data of the first shot. The data received by sensors in the cables 213 are transferred to the tape drive component 211 of the recording subsystem 207, or other archival medium, for further processing. After the recording of the data of the first shot, the navigation system 203 sends a start signal of the next shot to the acquisition subsystem 209. As the predicted shot time approaches, the navigation system 203 sends a fire command signal to the start the firing sequence of the second shot.

In marine seismic acquisition operations the Distance Method is used to activate or fire the energy source after the seismic shooting vessel has traversed a certain predetermined distance or arrived at a predetermined location. For example, the system may be programmed such that the acoustic source may be fired after the seismic source vessel has traveled 25 meters from the previous shot location (shot point). Alternatively, the shot points may be chosen based on desired survey coordinates determined prior to seismic data acquisition (i.e. preplot or preplanned coordinates).

The Distance Method of shooting is usually the preferred method for geophysical reasons. It is generally easier to obtain fairly uniform subsurface coverage if the source spacing is substantially equidistant over the survey area, as the Distance Method of shooting will provide in many instances.

For the Distance Method of shooting the vessel sails along a pre-plotted line with shot points positioned at fixed intervals along the line or in the survey area. Using the satellite based Global Positioning System (GPS) 201, the Navigation System 203 computers continuously calculate the vessel's position and arrival time at each of the shot points along the line or in the survey area.

Figure 3A:
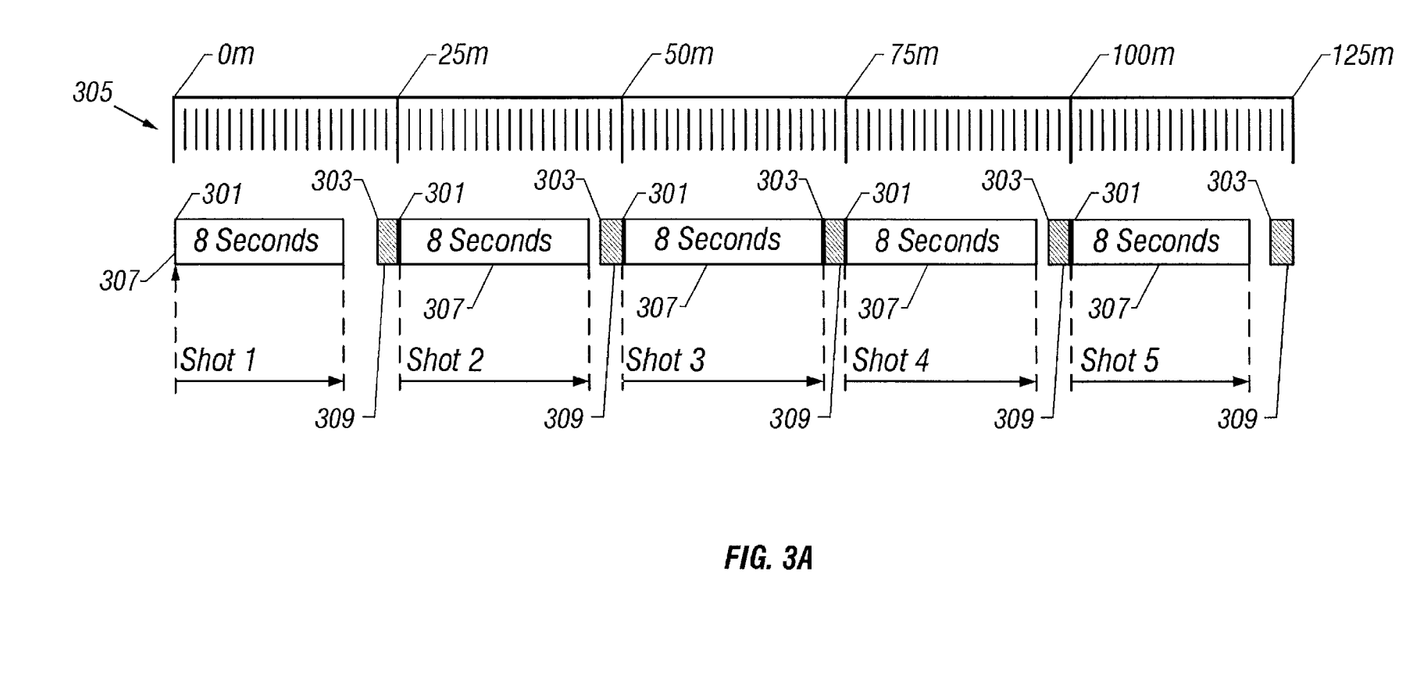
FIG. 3A is an illustration of the Distance Shooting method.

FIG. 3A shows schematically how the Distance Shooting method works. A distance reference scale 305 is shown with strong demarcations every 25 meters. Two of the activities of the seismic acquisition system, shot recording and system resetting, are shown relative to traversing along the distance reference. The clear rectangle 307 represents shot recording with reference to distance. The time for recording used here is the example of a nominal 8-second shot record length. A recording start 301 at the left hand side of the shot recording rectangles 307 indicates initiation of the seismic source as well as the recording of seismic energy. The rectangle 307 also represents the distance over which the acquisition system traverses as the data are recorded. For all the recording sequences in the example of FIG. 3A Shots 1 through 5, the shot record lengths are 8 seconds in duration. Prior to the source and recording initiation 301 is a System Reset sequence 309, represented by shaded rectangles, where the seismic system is readied for the upcoming shot recording. For example, prior to Shot 2, the system reset sequence 309 is initiated 303 with time to allow the system to be ready to acquire the shot. This may be called a 'start' or 'arming' sequence, and this sequence 309 finishes at the initiation of the shot/recording 301.

The smaller shaded rectangles 309 in FIG. 3A represent the seismic acquisition system resetting activity relative to distance traversed by the acquisition system. Based upon a time prediction of when the source vessel will be substantially in position to fire the next shot, the reset sequence 309 is activated in order to allow time for all system components to be ready to fire and record the next shot.

The first shot in a sequence is a Predicted Shot that may be based upon the time the Navigation System calculates the arrival at the shot point position. At the appropriate time before the vessel reaches the shot point (actual timing varies with the type of recording system, etc.) the Navigation System 203 sends a signal, sometimes called a 'start' signal, to the Recording System. This 'start' signal is just an arming signal to prepare the Recording System for the upcoming event. This start signal may be represented, for example by 303 the initial position of the System Reset sequence 309. After the 'start' sequence the Recording System waits for a signal that the shot has been initiated or is occurring and then the seismic energy is recorded. The usual case in Distance Shooting has been that the system reset sequence 309 does not begin 303 until after the completion of the previous shot record.

Referring to FIG. 2 in relation to FIG. 3A, as the predicted shot time approaches, the Navigation System 203 sends a Fire Command signal to the Gun Controller 205 to initiate the firing sequence, during which the Fire Command 'start' signal 303 may be received as the Recording System 207 is readied to record the returned seismic energy. The Gun Controller 205 performs some internal checks to optimize the energy of the source and fires the guns 301. The Gun Controller 205 sends a signal back to the Navigation System 203 and Recording System 207 at the time the guns are fired. The Recording System 207 begins recording seismic data of the shot, usually when the Seismic Acquisition System is at the position represented by 301, when the seismic source vessel is substantially coincident in time and position with the designated shot point location. The recording of a shot takes place over 8 seconds as the Seismic Acquisition System traverses at least part of the distance between shot points. In the example of FIG. 3A, the distance between shot points is 25 meters. In the Distance Method, after the recording of the data of the first shot, the Navigation System sends a 'start' signal of the next shot to the Recording System 207. As the predicted shot time approaches, the Navigation System 203 sends a Fire Command signal to start the firing sequence of the next shot.

The second method of marine seismic acquisition, the Timing Method, is to fire the acoustic source regularly at predetermined times, rather than predetermined positions or distances. For example, the system may be programmed to fire the acoustic sources every 8 seconds regardless of where the source vessel is located.

For this method of 'shooting on time,' or Timed Shooting, the vessel(s) and seismic acquisition system move through the survey area along a pre-plotted line with shot points positioned along the line or in the survey area. For example, from FIG. 2, using the satellite based Global Positioning System 201 the Navigation System 203 computers continuously calculate the vessel's position and arrival time for each of the shot points in the seismic survey.

Figure 3B:
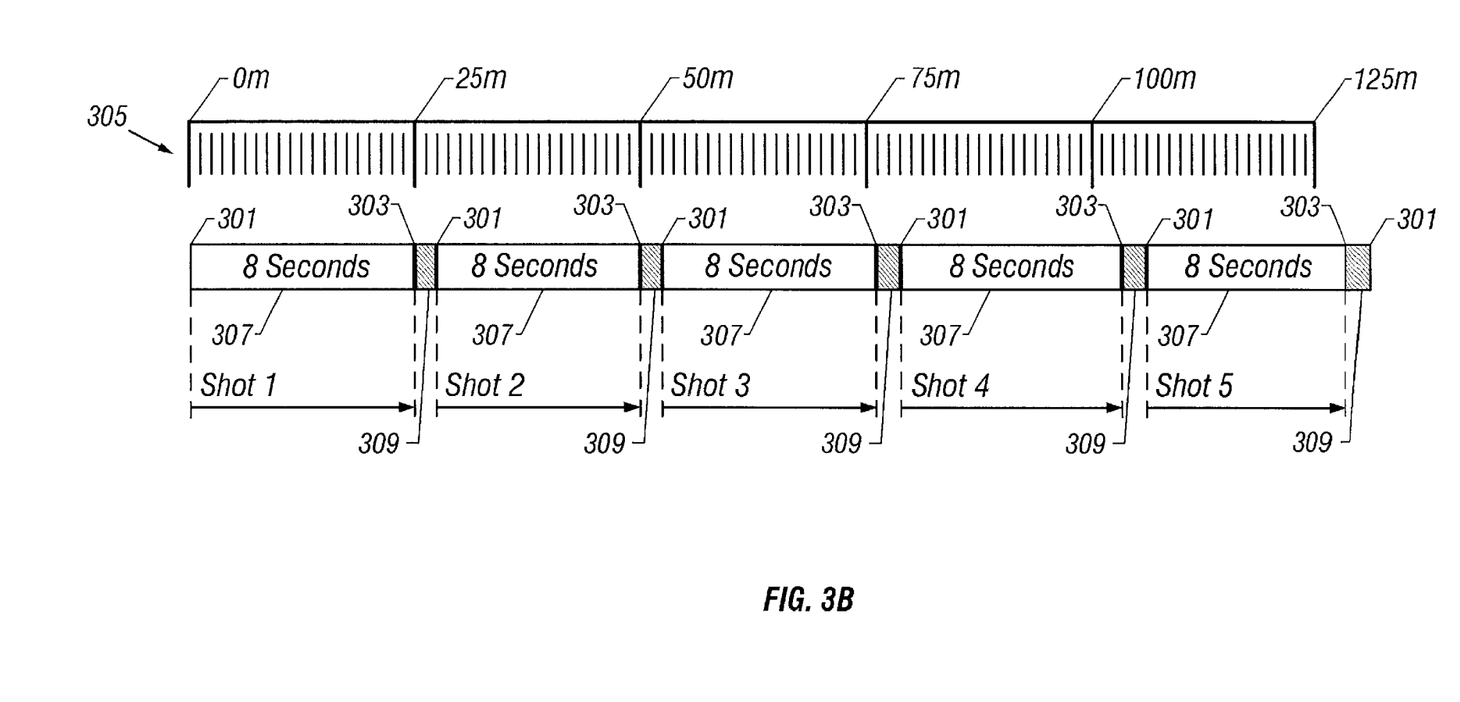
FIG. 3B is an illustration of the Timed Shooting Method.

Again, comparing FIG. 2 with FIG. 3B, the first shot in a 'shooting on time' sequence is a Predicted Shot, based upon the time the Navigation System 203 calculates the arrival time for the shot point position 301. At the appropriate time before the vessel reaches the shot point (actual timing varies with the type of recording system, etc.) the Navigation System 203 sends a start signal 303 to the Recording Subsystem 207 that is an arming signal to prepare the Recording Subsystem 207 for the upcoming event. The Recording System starts a time 303 and waits for a signal that the shot is occurring 301.

As the predicted shot time approaches, the Navigation System 203 sends a Fire Command signal to the Gun Controller 205 to initiate the firing sequence 303, which may initiate the system reset sequence 309. The Gun Controller 205 performs some internal checks to optimize the energy of the source and to fire the guns at the predicted or desired shot time. The Gun Controller 205 sends a signal back to the Navigation System 203 and Recording System at the time the guns are fired 301. The Recording Subsystem 207 begins recording seismic data of the shot, for example, Shot 2 for 8 seconds 307. After the recording of the shot data, the Navigation System 203 sends a start signal 303 for the next shot reset sequence 309 to the Recording Subsystem 207. Subsequently, after a fixed time interval 309 the guns are fired for the next shot 301. Shot 3 is recorded, and each following shot, all based on time, independent of shot point distance separation.

FIG. 3B is a schematic version of the Timed Shooting method. For this example the system begins recording a Shot 1 307 at the point 301 relative to the distance reference 305 marked 0 meters. After traveling some distance over the 8 seconds and completing the recording of Shot 1, the system-reset sequence 309 begins 303. After completion of the reset sequence the system initiates activation of the seismic source at 301 and the next shot recording 307, here Shot 2, begins. The shot points may or may not end up being regularly spaced apart, depending upon the currents in the area the seismic acquisition system traverses, as well as the velocity of the seismic source vessel.

Strong currents in the field area of a marine seismic survey may create problems in acquiring uniform data coverage over the survey area for the Distance Shooting method. Currents moving in the direction the shooting vessel is also moving in may create the situation where there is insufficient time to record a complete shot record before the shooting vessel is in or passed the desired position to fire the next shot.

Some acquisition systems may be designed such that the seismic data are recorded continuously. For example, a continuous data seismic recording scheme is described in application Ser. No. 09/104,905 now U.S. Pat. No. 6,188,962 to Morgan, et al. When using a continuous data seismic system, the situation is similar to the conventional seismic system whereby the system reset time 303 (FIG. 3A and FIG. 3B) is reduced to zero.

A preferred embodiment of the present invention described here combines timed shooting and distance shooting so that an optimum survey may be acquired whether or not current conditions are problematic. The operator will not have to intervene to alter acquisition methods and the survey operations will not need to be interrupted. Instead, the recording system will adapt to the preferred mode for the given circumstances.

Figure 3C:
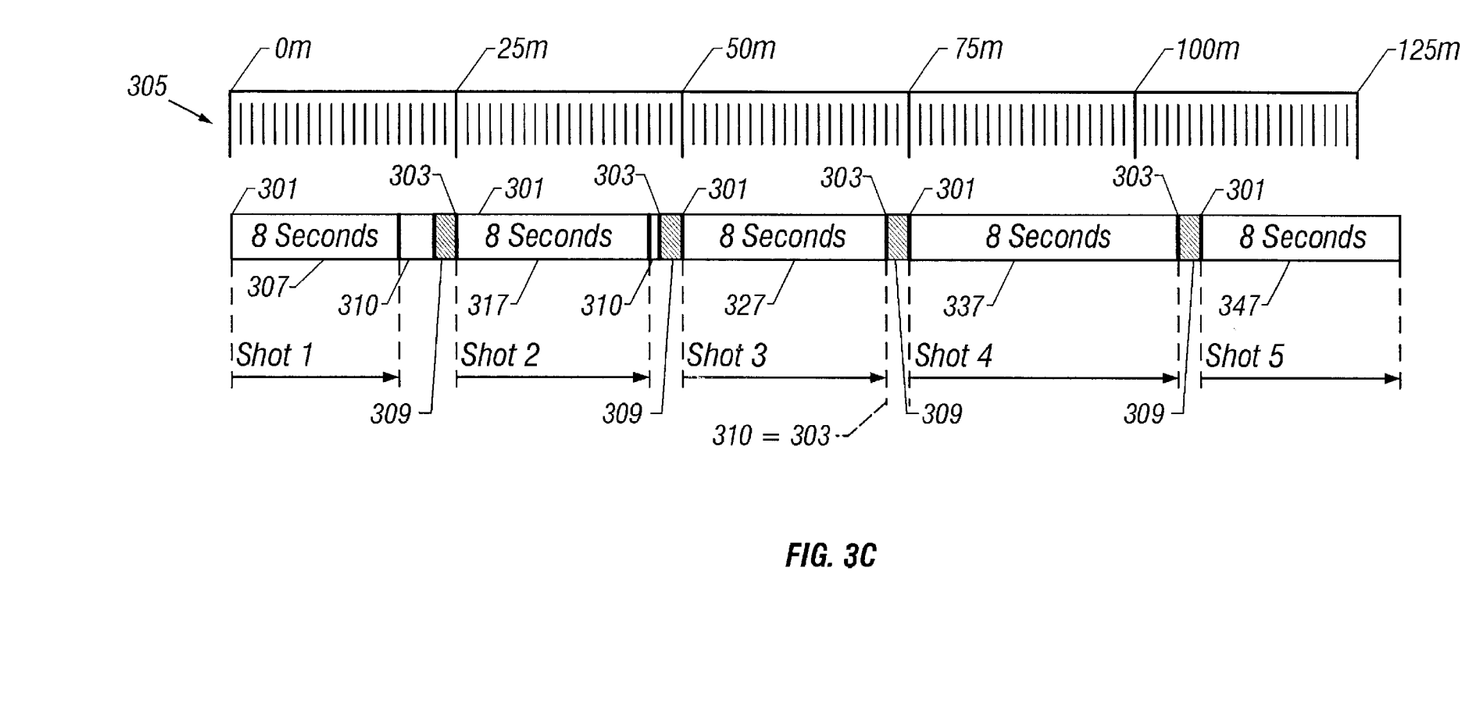
FIG. 3C is an illustration of the Timed Shooting Method With Dynamic Delay.

FIG. 3C shows a preferred embodiment of the Timed Shooting With Dynamic Delay method, which includes the advantages of the first two methods. The acquisition system will calculate (based on the information provided by the navigation system) the delay time needed for the shooting vessel to arrive at the next desired shot point interval where and when the next shot will be taken. This next desired source position is then opposite the previous source position where a shot was initiated. The dynamic delay from one shot to the next may depend on vessel speed and current. In the event that, due to strong currents, the delay time between the end of one shot recording and the activation of the next shot reduces to zero, it may be necessary to fire the next shot immediately upon completing the recording of a shot. This resembles the situation of timed shooting which is the preferred solution when the currents in the sailing direction get too strong.

FIG. 3C contains an example 8-second recording 307 represented in Shot 1 that finishes and is then followed by a system dynamic delay 310 prior to beginning 303 the system-reset sequence 309 which leads up to Shot 2. For purposes of relative position description, note that the source vessel position for Shot 2 is said to be on a side opposite Shot 1. The method uses a dynamic delay 310, represented by another clear rectangle, between the end of recording Shot 1 and beginning 303 system reset sequence 309 so that the subsequent Shot 2 recording 317 begins at 301 substantially near the desired Shot 2 shot point location. There is then a dynamic delay, 310 following the recording for Shot 2, which is combined with 309, between the end of the shot recording and the initiation of the next recording. This allows for Shot 3 recording 327 initiation 301 to occur substantially at the desired Shot 3 shot point location. As will be seen for subsequent Shots 4 and 5, when the dynamic delay 310 reduces to zero the present embodiment of the acquisition system behaves as if in timed shooting mode.

The Shot 3 recording 327 has a dynamic delay 310 of 0 time between the end of Shot 3 recording and the next system reset sequence 309 that is immediately prior to Shot 4. For Shot 3, the method is similar to both the Distance Shooting and the Timed Shooting, when for this method the dynamic delay is zero. For the first 3 shots of this example, the initiation of the shot recordings has taken place every 25 meters, the nominal separation from the example survey parameters. During Shot 4 the 8-second shot recording 337 occurs over a longer distance than 25 meters. The subsequent system reset and initiation of Shot 5 occurs further than 25 meters away from the coordinate where Shot 4 was initiated. The method of this invention has automatically changed from resembling the Distance Shooting Method to a system resembling the Timed Shooting Method. The acquisition of the seismic survey does not require interruption of field operations to change from one method to the other, and optimum survey acquisition parameters are implemented throughout operations.

Shot 5 recording 347 is initiated 301 along the survey traverse in this example after the source vessel has passed the desired shot point. Subsequent initiation of shot point recordings may be based on survey field conditions and desired parameters. For example, the shot point recording initiations may continue on a time based system until the shot point initiations once again fall substantially on desired shot points, when a dynamic time delay may allow recording shots substantially on the desired shot points.

Figure 4:
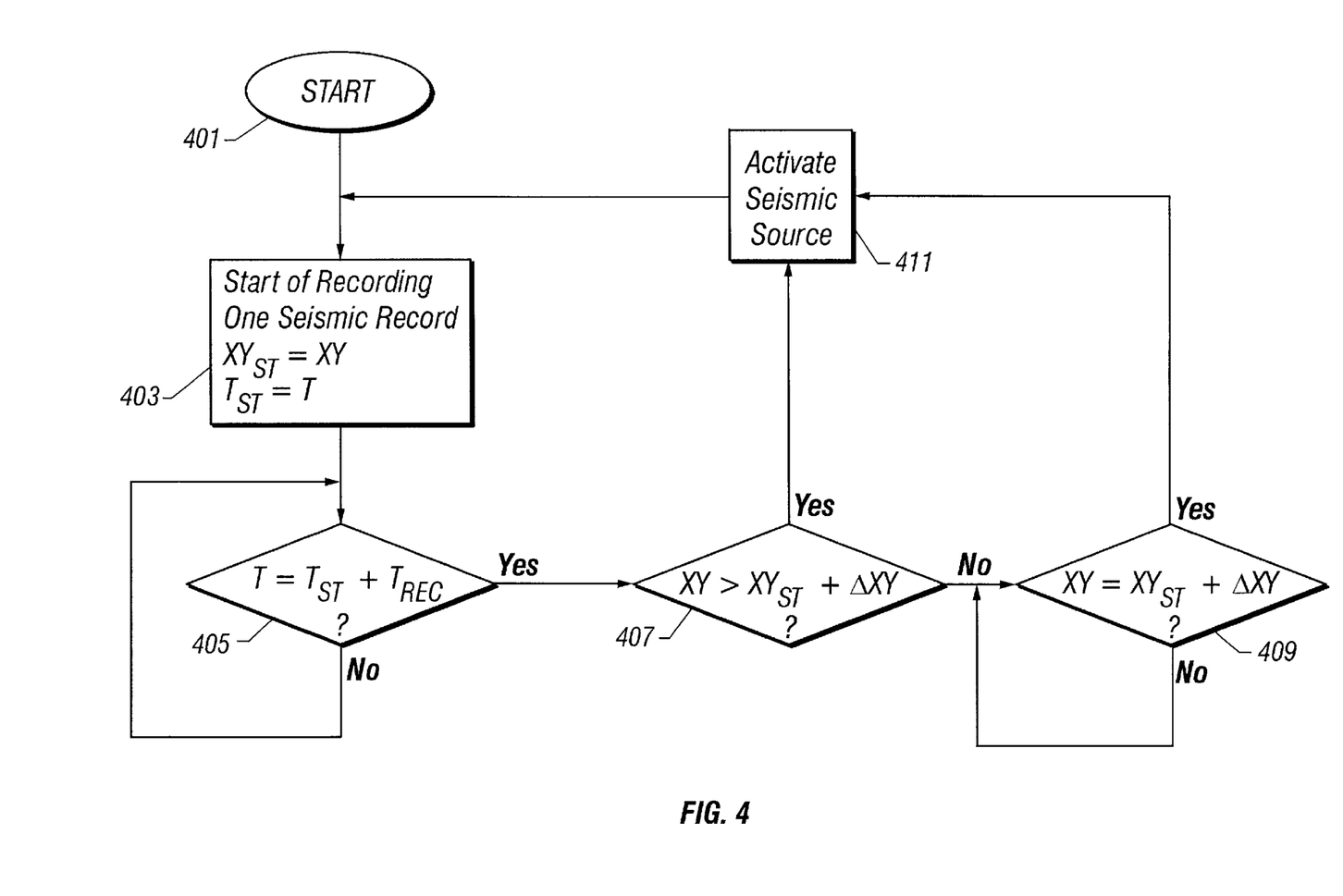
FIG. 4 is a flowchart of the Timed Shooting Method With Dynamic Delay.

FIG. 4 is a flowchart showing a preferred embodiment for the dynamic delaytime acquisition method. The system method start 401 may be chosen arbitrarily to be any point in the entire sequence, but will commonly be when the acquisition system has begun a system-reset sequence or immediately prior to firing and recording a shot. At 403 the acquisition system is in survey position XY to begin recording, so that the XY coordinate is the $XY_{ST}$, where $XY_{ST}$ is the desired (shot point) coordinate to start recording; the seismic source fires and recording is initiated.

Time, T, is the start time of the shot record, and equal to $T_{ST}$. At 405 the system performs a timing check to ascertain whether time, T, is equal to the start time of the shot record, $T_{ST}$, added to the length of time to record a shot record, $T_{REC}$. When the condition of 405 is satisfied the system moves on to 407 where a determination is made whether the seismic acquisition system has traversed a distance beyond the subsequent shot point coordinate position. This determination may be accomplished by comparing the current coordinate position of the acquisition system or source vessel, XY, to the last shot point coordinate start location with the shot spacing distance, ΔXY, added. Alternatively, the current coordinate position, XY, may be compared to a desired survey coordinate position. If the acquisition system has passed beyond the upcoming desired shot point position, the system moves to 411, a shot is fired, and the system behavior may be similar to a timed shooting method. If the seismic acquisition system has not passed beyond the next shot point, the system moves to 409, a dynamic delay is introduced until the next shot point position is reached before firing the seismic sources 411. This latter situation is similar to the distance shooting method. The dynamic delay may be accomplished for example by either performing a condition check for coordinates and/or distance, or by predicting the next shot point position initiation time.

This embodiment will facilitate seismic data that are sampled as regularly as possible and in a manner consistent with the best available mode of acquisition depending on the circumstances. In the situations that there is too severe a current in the sailing direction then automatically the system will change to a mode of acquisition resembling timed acquisition. Under other operating conditions the navigation may be varied so that duration and boat speed are chosen to maximize the acquisition efficiency. A very efficient Distant Shooting method closely resembles the Timed Shooting method because the time delay from the end of a shot record to the beginning of the next record will be minimal. This method can be used for recording systems that record seismic records as individual records as well as systems that utilize a memory buffer to hold the data before archiving the data to tape or other magnetic media.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method for acquiring marine seismic data using a seismic source towed by a seismic vessel, the method comprising:
    (a) determining a first desired source position;
    (b) activating the seismic source substantially at said first desired source position and propagating acoustic energy into the earth;
    (c) recording a response of the earth to said acoustic energy for a predetermined shot record time length;
    (d) determining at least one new desired source position;
    (e) determining a position of the source vessel;
    (f) determining whether the position of the source vessel is on a side of the at least one new desired source position opposite the first desired source position and determining if the source vessel has passed said at least one new desired position;
    (g) activating the seismic source and repeating steps (c) through (f) if said source vessel has passed said at least one new desired source position;
    (h) if said source vessel has not passed said at least one new desired position, delaying activation of the seismic source until the source vessel is substantially at said at least one new desired source position; and (i) activating the seismic source substantially at said at least one new desired source position and repeating steps (c) through (f).

2. The method of claim 1 wherein delaying activation of said seismic source further comprises determining a time the seismic source will be substantially at the at least one new desired source position.

3. The method of claim 2 wherein the at least one new desired source position comprises a plurality of desired source positions.

4. The method of claim 1 wherein said delaying activation of the seismic source is based on a velocity of the source vessel direction.

5. The method of claim 1 wherein determining the position of the source vessel further comprises using a Global Positioning System.

6. The method of claim 1 wherein determination of the at least one new desired source position further comprises determining a distance from a prior source position when the seismic source was activated.

7. The method of claim 1 wherein determining the at least one new desired source position further comprises using preplanned survey coordinates.

8. A method for acquiring marine seismic data using a seismic source towed by a seismic vessel, the method comprising:

(a) determining a first desired source position;

(b) determining a time the seismic source will be substantially at said first desired source position;

(c) activating the seismic source substantially at said first desired source position and propagating acoustic energy into the earth;

(d) recording a response of the earth to said acoustic energy for a predetermined shot record time length;

(e) determining at least one new desired source position;

(f) determining a position of the source vessel;

(g) determining whether the position of the source vessel is on a side of the at least one new desired source position opposite the first desired source position and determining if the source vessel has passed said at least one new desired source position;

(h) activating the seismic source and repeating steps (d) through (g) if said source vessel has passed said at least one new desired source position;

(i) if said source vessel has not passed said at least one new desired position, delaying activation of the seismic source until the source vessel is substantially at said at least one new desired source position; and (j) activating the seismic source substantially at said at least one new desired source position and repeating steps (d) through (g).

9. The method of claim 8 wherein the at least one new desired source position comprises a plurality of desired source positions.

10. The method of claim 8 wherein said delaying activation of the seismic source is based on a velocity of the source vessel direction.

11. The method of claim 8 wherein determining the position of the source vessel further comprises using a Global Positioning System.

12. The method of claim 8 wherein determining the position of the source vessel further comprises using a Global Positioning System based positioning system.

13. The method of claim 8 wherein the at least one desired source position is determined based on preplanned survey coordinates.

14. A method for acquiring marine seismic data for a seismic survey, using a seismic source towed by a seismic vessel, the survey having CMP lines, the method comprising:

(a) surveying an area of the earth using a seismic acquisition system with components including:

i) a source vessel moving through a seismic survey area to provide seismic acoustic energy;

ii) receiver elements, responsive to said acoustic seismic energy, for recording said acoustic seismic energy;

(b) determining a first desired source position;

(c) determining a time the seismic source will be substantially at said first desired source position;

(d) activating the seismic source substantially at said first desired source position and propagating acoustic energy into the earth;

(e) recording a response of the earth to said acoustic energy for a predetermined shot record time length;

(f) determining at least one new desired source position;

(g) determining a position of the source vessel;

(h) determining whether the position of the source vessel is on a side of the at least one new desired source position opposite the first desired source position and determining if the source vessel has passed said at least one new desired source position;

(i) activating the seismic source and repeating steps (e) through (h) if said source vessel has passed said new desired source position;

(j) if said source vessel has not passed said at least one new desired position, delaying activation of the seismic source until the source vessel is substantially at said at least one new desired source position; and (k) activating the seismic source substantially at said at least one new desired source position and repeating steps (e) through (h).

15. The method of claim 14 wherein delaying activation of said seismic source further comprises determining a time the seismic source will be substantially at the at least one new desired source position.

16. The method of claim 14 wherein said delaying activation of the seismic source is based on a velocity of the source vessel direction.

17. The method of claim 14 wherein the seismic acquisition system position is determined using a Global Positioning System.

18. The method of claim 14 wherein determining the position of the source vessel further comprises using a Global Positioning System.

19. The method of claim 14 wherein determination of the at least one new desired source position further comprises determining a distance from a prior source position when the seismic source was activated.

20. The method of claim 14 wherein at least one location of any desired source position is determined based on preplanned survey coordinates.

* * * * *